Aug. 28, 1962    A. F. MANZ    3,051,828
WORK-IN-CIRCUIT CONSUMABLE ELECTRODE ARC WELDING
Filed May 11, 1960    2 Sheets-Sheet 1

INVENTOR.
AUGUST F. MANZ
BY
Barnwell R. King
ATTORNEY

Aug. 28, 1962    A. F. MANZ    3,051,828
WORK-IN-CIRCUIT CONSUMABLE ELECTRODE ARC WELDING
Filed May 11, 1960    2 Sheets-Sheet 2

INVENTOR.
AUGUST F. MANZ
BY
Barnwell P. King
ATTORNEY

United States Patent Office 3,051,828
Patented Aug. 28, 1962

3,051,828
WORK-IN-CIRCUIT CONSUMABLE ELECTRODE ARC WELDING
August F. Manz, Newark, N.J., assignor to Union Carbide Corporation, a corporation of New York
Filed May 11, 1960, Ser. No. 28,435
2 Claims. (Cl. 219—131)

This invention relates to gas shielded arc welding, and more particularly to work-in-circuit arc welding with a consumable wire electrode.

In direct current arc welding systems employing consumable electrodes, it is possible for an electrical short circuit to occur across the arc zone. It is known that such phenomenon occurs during welding when a molten metal globule is in simultaneous contact with the weld puddle and the end of the consumable electrode. It also occurs with each weld start as the consumable electrode contacts the base plate so that a portion of the electrode in the arc zone is melted, or fused away. This creates a gap between the base plate and the consumable electrode across which a welding arc can be established. In such cases, gravity, surface tension, and the electromagnetic pinch effect aid in the process of metal transfer from the consumable electrode to the workpiece.

Surface tension and electromagnetic pinch effect are major contributing factors to such phenomenon. The importance of surface tension during the transfer of a drop onto a liquid surface is well known. For example, a liquidus mass at the end of a dropper will flow onto a liquid surface as a result of the surface tension. Furthermore, since no electrical forces are present in that case, the electromagnetic pinch effect is of no consequence and therefore is not considered.

Such phenomenon can be likened to a similar sequence of events which occur when a molten metal globule is transferred across an arc zone after it contacts the molten puddle. However, in such case, the additional effects of electromagnetic pinch are present and have been mathematically (Electromagnetic Problems in Electrical Engineering, by B. Hague, Oxford University Press, London: Humphrey Milford, 1929, pp. 345–348) as well as physically established. When the influence of the electromagnetic pinch effect is not present, a certain finite period is required for the liquid globule to be transferred from the consumable electrode into the weld puddle. As a case in point, where the electrode feed rate is too great, the unmelted electrode will contact the weld pool prior to the transfer of the molten globule because the transfer interval is too long; therein an erratic welding condition is created.

However, with application of sufficient electromagnetic pinch effect force upon the metal transfer process, this sometimes undesirable condition is minimized. By adding the forces inherent to the pinch effect, the finite period of transfer of the liquid globule can be decreased substantially. This decrease of the metal transfer period causes a liquid globule to transfer before the unmelted electrode can contact the weld pool. This results in a complete transfer of the molten metal globule and the subsequent creation of an arc gap across which the welding arc can be re-established.

Therefore, it is the object of the invention, as described herein, to create a sufficient electromagnetic pinch force in the arc zone so that the highly undesirable condition of unmelted electrode in contact with the weld pool is minimized and a more stable welding cycle is obtained.

Other objects are to increase the efficiency, reduce the cost, and improve welds made with a consumable electrode in circuit with an arc and the work being welded.

The invention provides an arc stabilizing device comprising a series condenser-rectifier circuit connected in parallel circuit relationship to the welding arc zone for creating a current pulse of sufficient magnitude to create a pinch effect of sufficient duration and magnitude to complete a short-circuit metal transfer between such electrode and the work being welded.

The invention also provides a process of short-circuiting type metal transfer arc welding which comprises first charging a condenser, feeding a wire electrode toward work to be welded, simultaneously energizing a welding zone between the end of such electrode and work upon contact therebetween with direct current arc welding power and discharging such condenser to aid such power, thereby starting a welding arc in such zone, continuing to feed such wire as metal is transferred from the wire to the work, while simultaneously charging such condenser with a polarity such that subsequent discharge thereof aids such arc welding power, characterized in that the discharge of such condenser is conducted through a unidirectional path.

Figure 1:
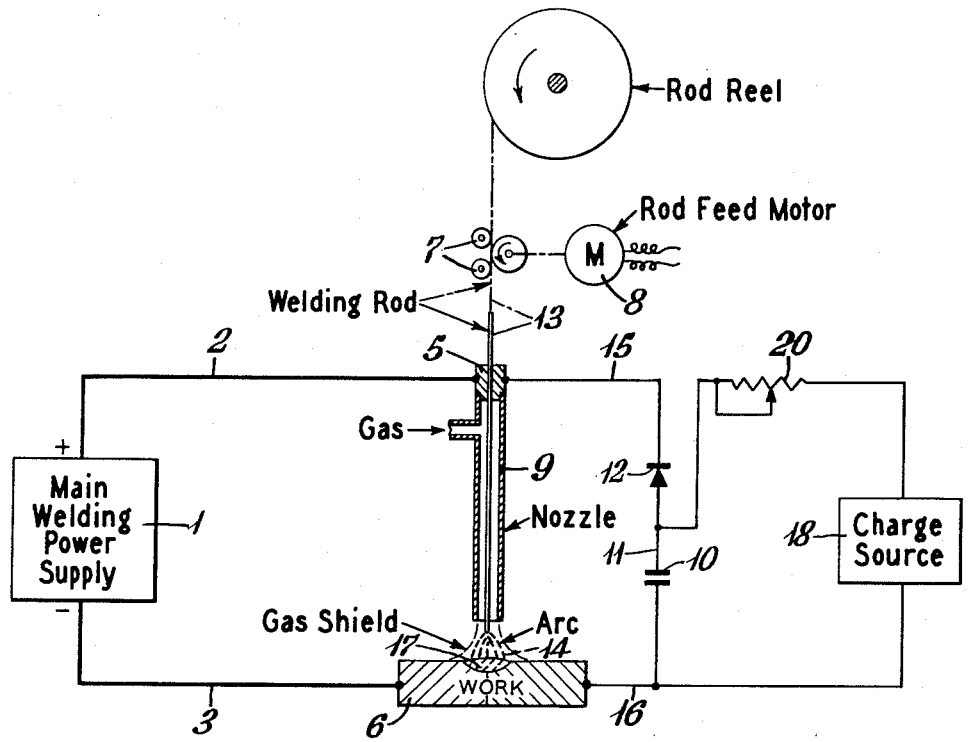
FIG. 1 is a circuit diagram illustrating the invention.

As shown in FIG. 1, there is provided a direct current source 1 of arc welding power, the output leads 2 and 3 of which are connected to a wire 13 through a contact-guide tube 5, and to the work 6 to be welded, respectively. Such wire is fed toward the work by a feed mechanism 7 including a motor 8. Shielding gas is supplied through a gas cup or nozzle 9 to protect the welding operation by an annular stream as the electrode of wire 4 is consumed.

A condenser 10 and a half-wave rectifier 12 are connected in a series circuit 11 with each other, such circuit 11 being connected in parallel relation with the welding arc power source as well as with the welding arc 14 by leads 15 and 16.

When the condenser 10 is charged to a voltage level equal to or smaller than the arc voltage, it cannot be discharged through the arc zone 14, because it is at a lower potential. Also, since the rectifier 12 conducts current only in one direction, the condenser 10 cannot be charged to a higher level by the arc voltage. However, should a short circuit occur, due to contact between the consumable electrode 4 and weld puddle 17, then the potential across the arc zone decreases to a value as determined by Ohm's law. For example, with 0.030 inch Oxweld (Linde) 65 wire, 100 amperes, the voltage across the short circuit is approximately 2 to 5 volts, depending upon the electrode extension. Because of the sudden decrease in the voltage across the arc zone from arc potential to short circuit potential, the condenser 10 discharges via rectifier 12 through the short circuit. Thus, upon short circuiting, the component of current from condenser 10 is added to the existing current supplied by the main welding power supply 1 to the welding zone.

In copending application Serial No. 614,921, filed October 9, 1956 by George M. Skinner, now Patent No. 2,936,364, assigned to the assignee of the present application, an arc stabilizing condenser is connected across the welding arc. Such condenser was rated at a sufficiently high capacity and voltage to supply a current pulse during a short-circuit without completely discharging the condenser. However, this required the use of rather large condenser in order for charge to remain on the condenser after the short circuit is cleared. Furthermore, if no charge remained on the condenser, it acted as an arc quenching device. A much smaller condenser (and hence less expensive) connected in series with a half-wave rectifier as discussed herein, overcomes such problems.

The condenser 10, however, preferably is of sufficient capacity to provide enough current to create a pinch force of sufficient duration and magnitude to complete the transfer of the globule before the unmelted electrode is driven into the weld puddle. As the arc gap is recreated and the main power supply attempts to start a new arc, the condenser 10 would tend to absorb the electrical energy supplied by the main power source and prevent the arc from being established. However, since the half-wave rectifier is in series circuit relation with the condenser, such arc quenching action of the condenser is minimized by virtue of the unidirectional path provided by such circuit. In essence, the condenser without the rectifier would act as an arc quenching device.

With the conventional spray-type welding arc, a short circuit usually occurs only at starting and, hence, it is only necessary to have the condenser charged for such short circuit discharge. This is not the case, however, in short-circuiting type metal transfer short-arc welding, wherein the short circuiting-arcing cycle is repeated many times a second. Therefore, an auxiliary power supply is needed to energize the discharged condenser 10. This is accomplished by connecting a second direct current power supply 18 through an adjustable impedance such as resistor 20 directly across the condenser 10. Such power supply should have an open circuit voltage no greater than the minimum steady-state arcing potential. This characteristic prevents the condenser charging source 18 from supplying arc power through the rectifier, and thus eliminates the necessity for a condenser charging source with a high current, high duty cycle.

In the short-circuiting metal transfer type of short-arc welding process, the main welding power supply may not provide a sufficient electromagnetic pinch force to aid the surface tension in creating a stable cycle, but the condenser-rectifier-charging source system of the invention does so. The following example illustrates these concepts.

Experiments indicate that for a molten cylindrical conductor, the initial pinch force, $F_p = I^2/200$, where "$I$" is the current in the conductor. For the same molten cylindrical conductor, the surface tension forces, $F_s = 2\pi rS$, where "$r$" is the radius of the cylinder and "$S$" is the surface tension. If the pinch force $F_p$ is equated to the surface tension force, $F_s$, it is possible to determine the current which is necessary to create a necking down of the molten conductor and cause the molten globule below the pinch zone to be transferred to the weld puddle. Generally, $I = (400\pi rS)^{1/2}$.

For wire of 0.04 centimeter in radius, the current "$I$" required to exceed the surface tension "$S$" can be found by the following equation: $I = 7.1S^{1/2}$, where "$S$" is measured in dynes/cm. Table I lists the currents determined for various materials when applying this equation.

*Table I*

| Material: | Current-amperes |
|---|---|
| Aluminum | 162 |
| Cast iron | 215 |
| Ferrosilicon | 241 |
| Iron—2.2% carbon | 275 |
| Iron—3.9% carbon | 240 |

It is to be noted that such current values are of the order of magnitude of 200 amperes+50 amperes. Thus, it is evident that a current component must be added to the component of current of the main power supply to create a total current of 200+50 amperes. The value of C can be determined as follows:

$$C = T/R$$

Where:
T=Average duration of short-circuit in seconds.
R=Resistance of condenser discharge circuit, including the short circuit.

For example, if:
T=0.0015 seconds and R=0.4 ohms
C=0.0015/0.04=0.037 farads.

As an additional example, for:
T=0.001 seconds, R=0.02 ohms,
C=0.001/0.02=.05 farads.

Capacitor 10 _____ 0.046 farads, rated 20–30 WVDC.
Rectifier 12 _____ Rated at 100 amperes, 52 VDC.
Resistor 20 _____ Rated at 5 ohms and 25 watts.
and
Charge source 18 ____ Rated at 12 volts, open circuit.

Figure 4:
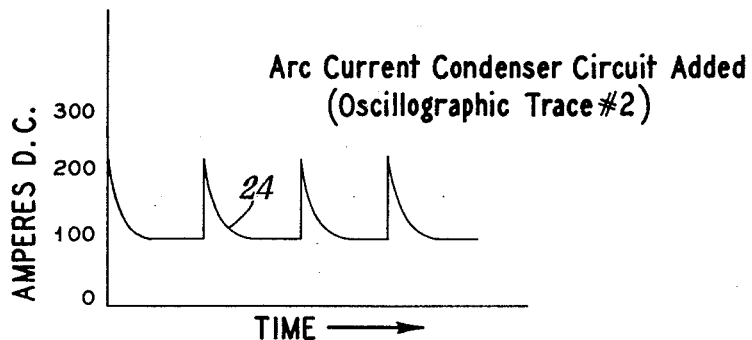

A short-arc welding condition was established using a constant potential slope controlled welding power supply set for maximum down slope, with the short-circuiting type of short-arc arrangement (Linde ST–2, SWM–2, 0.030 inch Oxweld 65 wire, C–25 gas, 15 c.f.h., mild steel plate). Without the arc stabilizing system of the invention, a short-arc weld with borderline stability (where the unmelted electrode is intermittently touching the base plate) was selected. When the arc stabilizing circuit of the invention was used, current surges of approximately 100 to 150 amperes were added during the short-circuit periods. Improved arc stability was immediately apparent. Traces 22 and 24 of oscillographs, FIGS. 2 and 4, show the current-time characteristic before and after the addition of the arc stabilizing circuit.

Figure 2:
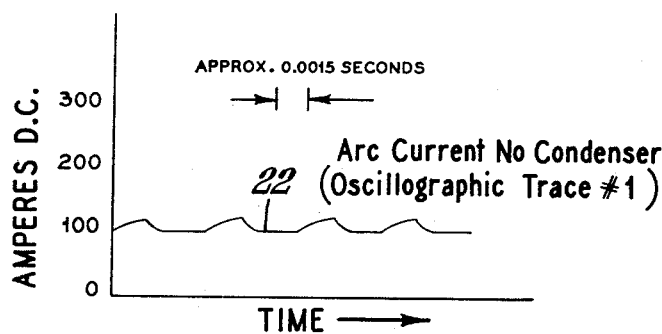
FIGS. 2, 3 and 4 are current-time oscillograms with no condenser, with a condenser only, and with the invention, respectively.
Figure 3:
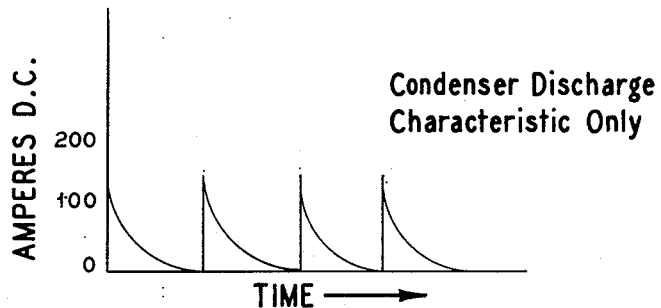

In the oscillograph, FIG. 2, the current versus time trace 22 of the borderline stability short-arc weld is shown. Note the low magnitude of the current peaks when compared to oscillograph, FIG. 4, which shows the current versus time with the arc stabilizing circuit added. In the FIG. 4 oscillograph, current pulses were supplied by the stabilizing circuit great enough to create a total current peak at least twice that shown in the FIG. 2 oscillograph.

Figure 5:
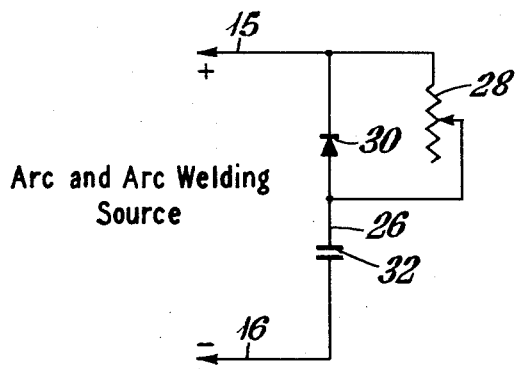
FIG. 5 is a circuit diagram of a modification.

As shown in FIG. 5, condenser-rectifier circuit 26 includes an adjustable impedance such as resistor 28 connected in parallel circuit relation with the half-wave rectifier 30, so that the condenser 32 is charged by the welding arc current source at a rate determined by such resistance, without interfering with discharge of the condenser 32 according to the invention.

What is claimed is:
1. Work-in-circuit consumable electrode arc welding apparatus comprising, in combination, a direct current source of arc welding power, means for feeding a wire toward the work to be welded, a circuit for conducting arc welding current to such work and to said wire as it is so-fed by said wire feed means; an auxiliary starting and stabilizing circuit connected in parallel with said direct current source and with said wire electrode and the work comprising a condenser and a rectifier connected in series circuit relation with each other for aiding said welding current source to establish the welding arc and stabilize such arc in operation and an adjustable resistor connected in parallel circuit relation with said rectifier for permitting the welding arc direct current source to charge said condenser, without affecting the discharge thereof, when a voltage drop which is below the welding arc voltage occurs between the end of the electrode and such work.

2. Work-in-circuit consumable electrode arc welding apparatus comprising, in combination, a direct current source of arc welding power, means for feeding a wire toward the work to be welded, a circuit for conducting arc welding current to such work and to said wire including a guide tube constituting an electrical contact with said wire as it is so-fed by said wire feed means; an auxiliary starting and stabilizing circuit connected in parallel with said direct current source and with said wire electrode and the work comprising a condenser and a rectifier connected in series circuit relation with each other for aiding said welding current source to establish the welding arc and stabilize such arc in operation, and a direct current charging circuit for said condenser, in which said condenser charging circuit is energized by said welding current source and in which a resistor is connected in parallel circuit relation with said rectifier whereby said welding current source charges said condenser through said resistor without affecting discharge of the condenser through said rectifier.

References Cited in the file of this patent

UNITED STATES PATENTS

| | | |
|---|---|---|
| 2,936,364 | Skinner | May 10, 1960 |
| 2,969,494 | Davis | Jan. 24, 1961 |

FOREIGN PATENTS

| | | |
|---|---|---|
| 1,027,822 | Germany | Apr. 10, 1958 |